(12) United States Patent
Javed et al.

(10) Patent No.: US 12,038,945 B2
(45) Date of Patent: Jul. 16, 2024

(54) SYSTEM AND METHOD FOR MICROSERVICES TO MONOLITH—DATA SYNCBACK SOLUTION

(71) Applicant: JPMorgan Chase Bank, N.A., New York, NY (US)

(72) Inventors: Shariq Javed, Mumbai (IN); Ravi Pasupuleti, Mumbai (IN); Sriram Balasubramaniam, Mumbai (IN); Ashok Jha, Thane (IN); Pushkar Deshpande, Mumbai (IN); Harsha Ravella, Hyderabad (IN); Kunal Sharma, Mumbai (IN); Vini Pandya, Dewas (IN); Charles Hannum, IV, Chalfont, PA (US); Nikhil Patkar, Mumbai (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/978,666

(22) Filed: Nov. 1, 2022

(65) Prior Publication Data
US 2024/0095257 A1 Mar. 21, 2024

(30) Foreign Application Priority Data
Sep. 17, 2022 (IN) .............................. 202211053226

(51) Int. Cl.
*G06F 16/00* (2019.01)
*G06F 16/21* (2019.01)
*G06F 16/25* (2019.01)
*G06F 16/27* (2019.01)

(52) U.S. Cl.
CPC ............ *G06F 16/27* (2019.01); *G06F 16/214* (2019.01); *G06F 16/256* (2019.01)

(58) Field of Classification Search
CPC ....... G06F 16/27; G06F 16/214; G06F 16/256
See application file for complete search history.

(56) References Cited

U.S. PATENT DOCUMENTS

| | | | |
|---|---|---|---|
| 10,540,334 B1* | 1/2020 | Eswaran | G06F 16/258 |
| 2018/0246886 A1* | 8/2018 | Dragomirescu | G06F 16/2379 |
| 2019/0050469 A1* | 2/2019 | Puvvada | G06F 16/27 |
| 2021/0064360 A1* | 3/2021 | Moser | G06F 9/44536 |

(Continued)

*Primary Examiner* — Syed H Hasan
(74) *Attorney, Agent, or Firm* — GREENBLUM & BERNSTEIN, P.L.C.

(57) ABSTRACT

Various methods, apparatuses/systems, and media for data migration readiness of a target data source are disclosed. A processor invokes, in response to triggering a process, an application programming interface (API) to call corresponding source application or microservice hosted on a source database; updates, by the source application or microservice, the source database to reflect the changes made to one or more fields data of user profile; generates a mapping identifier (ID) in response to updating the source database; stores the mapping ID onto a mapping database in a predefined format; invokes another API call to obtain source table field details of the updated source database and the mapping ID that maps source column of the source table to a corresponding target column of a target table of a target database; and automatically updates the target database to match the updated data of the source database based on the mapping ID.

20 Claims, 10 Drawing Sheets

(56) References Cited

U.S. PATENT DOCUMENTS

2022/0365832 A1* 11/2022 Feng .................. G06F 9/547
2023/0224359 A1* 7/2023 Palladino ............ H04L 67/1004
                                                    709/223

* cited by examiner

| Source_Tab le_Name 702 | Source_Fi eld_Name 704 | Source_Fiel d_DataType 706 | Target_Dat abase_Type 708 | Target_Dat abase_Name 710 | Target_Ta ble_Name 712 | Target_Fi eld_Name 714 | Target_D ata_Type 716 | Replica te Flag 718 |
|---|---|---|---|---|---|---|---|---|
| sample_acc ount_info | acct_id | integer | IMS | DBSAMPLE | SMPLROOT | ACCOUNT_I D | Number | Y |
| sample_acc ount_info | acct_opn_ dt | Date | IMS | DBSAMPLE | SMPLROOT | DATE-ACCOUNT-OPEN | Date | Y |
| sample_acc ount_info | acct_type _cd | String | IMS | DBSAMPLE | SMPLROOT | ACCOUNT-TYPE | String | Y |
| sample_acc ount_info | appl_id | Integer | IMS | DBSAMPLE | SMPLROOT | APPLICATI ON-NUM | Number | Y |
| sample_acc ount_info | acct_bill _cyc_cd | String | IMS | DBSAMPLE | SMPLROOT | BILLING-CYCLE | String | Y |
| sample_acc ount_info | cadv_lmt_ am | Decimal | IMS | DBSAMPLE | SMPLROOT | CASH-LIMIT | Decimal | Y |
| sample_acc ount_info | card_cr_l mt_am | Decimal | IMS | DBSAMPLE | SMPLROOT | LIMIT-CREDIT | Decimal | Y |
| sample_acc ount_info | cr_lmt_up dt_dt | Date | IMS | DBSAMPLE | SMPLROOT | DATE-LAST-LIMIT-CHG | Date | Y |
| sample_acc ount_info | prev_card _expr_dt | Date | IMS | DBSAMPLE | SMPLROOT | EXP-ACCT-PRIOR-CARD | Date | Y |

Register Your Mapping 802 | Search Your Mapping 804 | User : XXX 801

Product Name 808

Data Distribution Service 810

Download Mapping Template 806

Upload your file | Excel file only in given format | Browse 812

Email 814

Do you want to receive a copy of the mapping?

Register / Submit 816

800

SYSTEM AND METHOD FOR MICROSERVICES TO MONOLITH—DATA SYNCBACK SOLUTION

CROSS-REFERENCE TO RELATED APPLICATIONS

This application claims the benefit of priority from Indian Patent Application No. 202211053226, filed Sep. 17, 2022, which is herein incorporated by reference in its entirety.

TECHNICAL FIELD

This disclosure generally relates to data processing, and, more particularly, to methods and apparatuses for implementing a platform and language agnostic data sync back solution module configured to provide both synchronous and asynchronous delivery and synchronize the data back to monolith application on any platform, including mainframe platform.

BACKGROUND

The developments described in this section are known to the inventors. However, unless otherwise indicated, it should not be assumed that any of the developments described in this section qualify as prior art merely by virtue of their inclusion in this section, or that these developments are known to a person of ordinary skill in the art.

Today, a wide variety of business functions are commonly supported by software applications and tools, i.e., business intelligence (BI) tools. For instance, software has been directed to data processing, data migration, monitoring, performance analysis, project tracking, and competitive analysis, to name but a few. In general, large enterprises, corporations, agencies, institutions, and other organizations are facing a continuing problem of handling, processing, and/or accurately describing a vast amount of data that are crucial to plan actions at store level or market/regional level in an efficient and expedited manner.

For example, microservices are getting increasingly popular as a novel software architecture. In the microservice architecture, a monolithic application is decomposed into small components, also referred to as "microservices". Each microservice communicates with other microservices usually with a Hypertext Transfer Protocol (HTTP) resource Application Programming Interface (API). The microservice architecture enables more agile development because each microservice is independently developable and deployable. A common development style is to implement a monolithic application first, and then decompose the monolithic application into microservices.

However, as new and existing functionality moves to cloud, mainframe databases would still need to be synchronized to perform the functionality that remains. There is no common framework right now that can integrate with the microservices to update DB2/IMS on card mainframe. An added complexity is the heterogeneity of databases. Moreover, conventional solution fails to synchronize the data back to the monolith application on mainframe platform. Every microservice is developing its own solution that increases time to market process. It may also create a technical debt for the microservices when underlying system is completely retired. Microservices can potentially be hosted on any platform GAP/GKP/AWS and using any database as System of Record (SOR). However, today, there appears to be no readily available product in market for Mainframe IMS. Current solutions rely on data replication solutions (asynchronous updates) which may not be viable in scenarios where information needs to be in-sync with all systems (for example: customer reporting a lost/stolen card). A conventional CDC (change data capture) solution to sync back data may not always be viable because modern applications could be spread across different type of databases and platforms.

Therefore, there is a need for an advanced tool that can address these conventional shortcomings.

SUMMARY

The present disclosure, through one or more of its various aspects, embodiments, and/or specific features or sub-components, provides, among other features, various systems, servers, devices, methods, media, programs, and platforms for implementing a platform and language agnostic data sync back solution module configured to execute both synchronous and asynchronous delivery and synchronize the data back to monolith application on any platform, including mainframe platform (i.e., Mainframe IMS Databases), but the disclosure is not limited thereto. For example, the present disclosure, through one or more of its various aspects, embodiments, and/or specific features or sub-components, also provides, among other features, various systems, servers, devices, methods, media, programs, and platforms for implementing a platform and language agnostic data sync back solution module configured to execute a generic data servicing between systems where CDC can't be used; and support turning off or change of target system without impacting the source application, but the disclosure is not limited thereto.

According to an aspect of the present disclosure, the present solution, as implemented by the platform and language agnostic data sync back solution module, can be used not just for mainframe platforms but any other application platform, such as monolithic application using ORACLE as SOR, but the disclosure is not limited thereto. For example, any application that has to sync up data from an OLTP (On-Line Transfer Processing) to (Operational Data Store) ODS and cannot use CDC products, can take advantage of this solution disclosed herein as implemented by the platform and language agnostic data sync back solution module, but the disclosure is not limited thereto. For example, the present solution, as implemented by the platform and language agnostic data sync back solution module as disclosed herein, can be invoked on any platform and provides ability to transactionalize or perform single or multiple database updates, but the disclosure is not limited thereto.

According to an aspect of the present disclosure, a method for data sync back solution for microservices to monolith by utilizing one or more processors along with allocated memory is disclosed. The method may include: receiving user input or a batch service that triggers a process to change one or more fields data corresponding to a user profile; invoking, in response to triggering the process, an application programming interface (API) to call corresponding source application or microservice hosted on a source database; updating, by the source application or microservice, the source database to reflect the changes made to the one or more fields data; generating a mapping identifier (ID) in response to updating the source database; storing the mapping ID onto a mapping database in a predefined format; invoking another API call to obtain source table field details of the updated source database and the mapping ID that maps source column of the source table to a corresponding target column of a target table of a target database; and automatically updating the target database to match the updated data of the source database based on the mapping ID.

According to a further aspect of the present disclosure, the predefined formant may be in Java Script Object Notation format.

According to another aspect of the present disclosure, the source database may be a public cloud or a private cloud.

According to yet another aspect of the present disclosure, in updating the source database, the method may further include: storing information data corresponding to the changes made to the one or more fields in a plurality of peer network nodes within a computer network.

According to an aspect of the present disclosure, in updating the source database, the method may further include: storing information data corresponding to the changes made to the one or more fields in a plurality of nodes in a replicated fashion within a distributed database.

According to a further aspect of the present disclosure, in updating the source database, the method may further include: storing information data corresponding to the changes made to the one or more fields in an authoritative data store.

According to another aspect of the present disclosure, changes made to the one or more fields data may include one or more of the following processes: updating one or more fields data; deleting one or more fields data; and inserting one or more new fields data, but the disclosure is not limited thereto.

According to yet another aspect of the present disclosure, invoking the API may include one or more of the following: invoking a POST API to create a new mapping ID; invoking a PUT API to update an existing mapping ID; invoking a GET API to select an existing mapping ID; and invoking a DELETE API to delete an existing mapping ID, but the disclosure is not limited thereto.

According to a further aspect of the present disclosure, the target database may be a mainframe database.

According to an aspect of the present disclosure, a system for data sync back solution for microservices to monolith is disclosed. The system may include: a processor; and a memory operatively connected to the processor via a communication interface, the memory storing computer readable instructions, when executed, may cause the processor to: receive user input or a batch service that triggers a process to change one or more fields data corresponding to a user profile; invoke, in response to triggering the process, an application programming interface (API) to call corresponding source application or microservice hosted on a source database; update, by the source application or microservice, the source database to reflect the changes made to the one or more fields data; generate a mapping identifier (ID) in response to updating the source database; store the mapping ID onto a mapping database in a predefined format; invoke another API call to obtain source table field details of the updated source database and the mapping ID that maps source column of the source table to a corresponding target column of a target table of a target database; and automatically update the target database to match the updated data of the source database based on the mapping ID.

According to another aspect of the present disclosure, in updating the source database, the processor may be further configured to: store information data corresponding to the changes made to the one or more fields in a plurality of peer network nodes within a computer network.

According to yet another aspect of the present disclosure, in updating the source database, the processor may be further configured to: store information data corresponding to the changes made to the one or more fields in a plurality of nodes in a replicated fashion within a distributed database.

According to a further aspect of the present disclosure, in updating the source database, the processor may be further configured to: store information data corresponding to the changes made to the one or more fields in an authoritative data store.

According to an aspect of the present disclosure, a non-transitory computer readable medium configured to store instructions for data sync back solution for microservices to monolith is disclosed. The instructions, when executed, may cause a processor to perform the following: receiving user input or a batch service that triggers a process to change one or more fields data corresponding to a user profile; invoking, in response to triggering the process, an application programming interface (API) to call corresponding source application or microservice hosted on a source database; updating, by the source application or microservice, the source database to reflect the changes made to the one or more fields data; generating a mapping identifier (ID) in response to updating the source database; storing the mapping ID onto a mapping database in a predefined format; invoking another API call to obtain source table field details of the updated source database and the mapping ID that maps source column of the source table to a corresponding target column of a target table of a target database; and automatically updating the target database to match the updated data of the source database based on the mapping ID.

According to yet another aspect of the present disclosure, in updating the source database, the instructions, when executed, may cause the processor to further perform the following: storing information data corresponding to the changes made to the one or more fields in a plurality of peer network nodes within a computer network.

According to an aspect of the present disclosure, in updating the source database, the instructions, when executed, may cause the processor to further perform the following: storing information data corresponding to the changes made to the one or more fields in a plurality of nodes in a replicated fashion within a distributed database.

According to a further aspect of the present disclosure, in updating the source database, the instructions, when executed, may cause the processor to further perform the following: storing information data corresponding to the changes made to the one or more fields in an authoritative data store.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 7 illustrates an exemplary mapping information table implemented by the platform, language, and cloud agnostic data sync back solution module of FIGS. 4-6 in accordance with an exemplary embodiment.

FIG. 8 illustrates an exemplary graphical user interface (GUI) implemented by the platform, language, and cloud agnostic data sync back solution module of FIGS. 4-6 in accordance with an exemplary embodiment.

DETAILED DESCRIPTION

Figure 1:
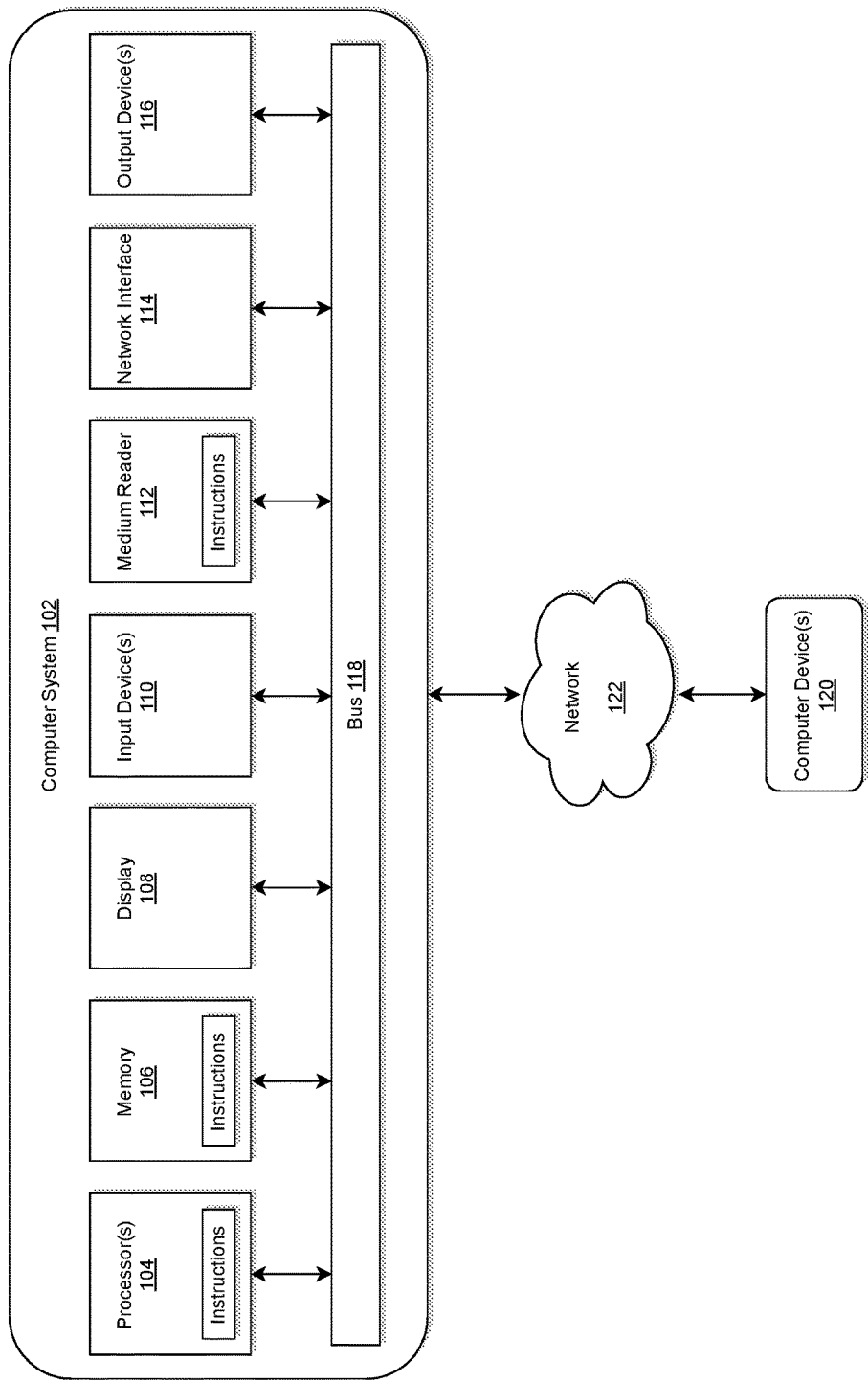
FIG. 1 illustrates a computer system for implementing a platform, language, and cloud agnostic data sync back solution module configured to execute both synchronous and asynchronous delivery and synchronize the data back to monolith application on any platform in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system 100 for use in implementing a platform and language agnostic data sync back solution module configured to execute both synchronous and asynchronous delivery and synchronize the data back to monolith application on any platform in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, a visual positioning system (VPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

According to exemplary embodiments, the data sync back solution module may be platform, language, and cloud agnostic that may allow for consistent easy orchestration and passing of data through various components to output a desired result regardless of platform, language, and cloud environment. Since the disclosed process, according to exemplary embodiments, is platform, language, and cloud agnostic, the data sync back solution module may be independently tuned or modified for optimal performance without affecting the configuration or data files. The configuration or data files, according to exemplary embodiments, may be written using JSON, but the disclosure is not limited thereto. For example, the configuration or data files may easily be extended to other readable file formats such as XML, YAML, etc., or any other configuration based languages.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
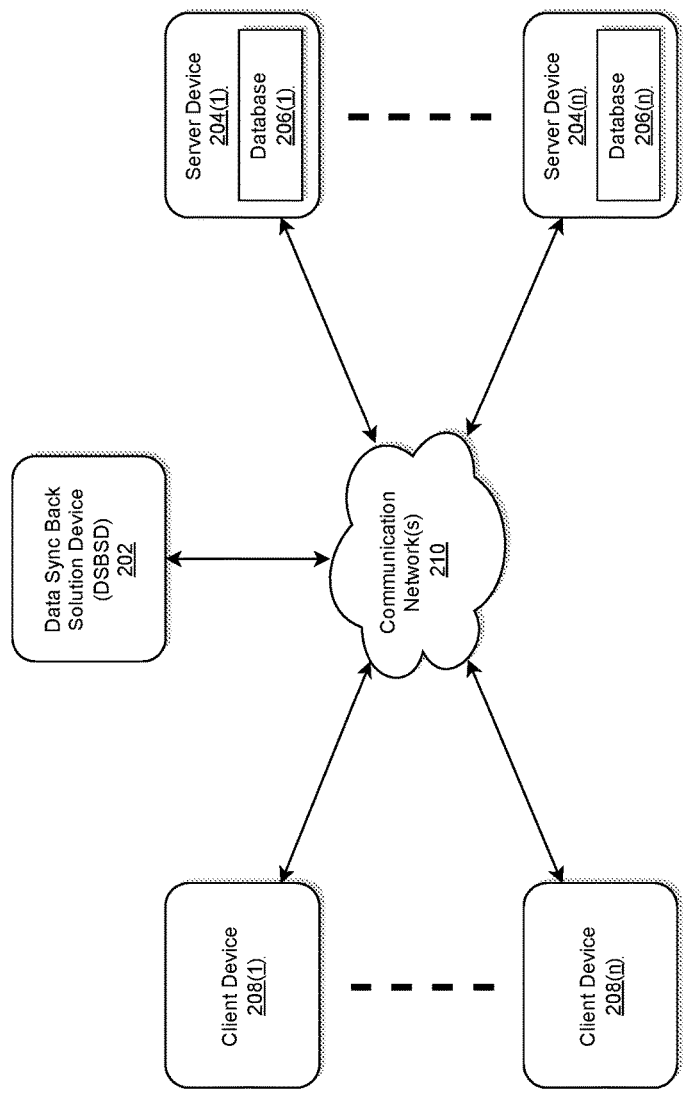
FIG. 2 illustrates an exemplary diagram of a network environment with a platform, language, and cloud agnostic data sync back solution device in accordance with an exemplary embodiment.

Referring to FIG. 2, a schematic of an exemplary network environment 200 for implementing a language, platform, and cloud agnostic data sync solution device (DSBSD) of the instant disclosure is illustrated.

According to exemplary embodiments, the above-described problems associated with conventional tools may be overcome by implementing a DSBSD 202 as illustrated in FIG. 2 that may be configured for implementing a platform and language agnostic data sync back solution module configured to execute both synchronous and asynchronous delivery and synchronize the data back to monolith application on any platform, including mainframe platform (i.e., Mainframe IMS Databases), but the disclosure is not limited thereto. For example, according to exemplary embodiments, the above-described problems associated with conventional tools may be overcome by implementing a DSBSD 202 as illustrated in FIG. 2 that may be configured for implementing a platform and language agnostic data sync back solution module configured to execute a generic data servicing between systems where CDC can't be used; and support turning off or change of target system without impacting the source application, but the disclosure is not limited thereto.

The DSBSD 202 may be the same or similar to the computer system 102 as described with respect to FIG. 1.

The DSBSD 202 may store one or more applications that can include executable instructions that, when executed by the DSBSD 202, cause the DSBSD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DSBSD 202 itself, may be located in virtual server(s) running in a cloud-based computing environment rather than being tied to one or more specific physical network computing devices. Also, the application(s) may be running in one or more virtual machines (VMs) executing on the DSBSD 202. Additionally, in one or more embodiments of this technology, virtual machine(s) running on the DSBSD 202 may be managed or supervised by a hypervisor.

In the network environment 200 of FIG. 2, the DSBSD 202 is coupled to a plurality of server devices 204(1)-204(n) that hosts a plurality of databases 206(1)-206(n), and also to a plurality of client devices 208(1)-208(n) via communication network(s) 210. A communication interface of the DSBSD 202, such as the network interface 114 of the computer system 102 of FIG. 1, operatively couples and communicates between the DSBSD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DSBSD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DSBSD 202 may be a standalone device or integrated with one or more other devices or apparatuses, such as one or more of the server devices 204(1)-204(n), for example. In one particular example, the DSBSD 202 may be hosted by one of the server devices 204(1)-204(n), and other arrangements are also possible. Moreover, one or more of the devices of the DSBSD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DSBSD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the DSBSD 202 that may efficiently provide a platform for implementing a platform and language agnostic data sync back solution module configured to execute both synchronous and asynchronous delivery and synchronize the data back to monolith application on any platform, including mainframe platform (i.e., Mainframe IMS Databases), but the disclosure is not limited thereto. For example, according to exemplary embodiments, the client devices 208(1)-208(n) in this example may include any type of computing device that can facilitate the implementation of the DSBSD 202 that may efficiently provide a platform for implementing a platform and language agnostic data sync back solution module configured to execute a generic data servicing between systems where CDC can't be used; and support turning off or change of target system without impacting the source application, but the disclosure is not limited thereto.

The client devices 208(1)-208(n) may run interface applications, such as standard web browsers or standalone client applications, which may provide an interface to communicate with the DSBSD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the DSBSD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as may be appreciated by those skilled in the relevant art(s).

One or more of the devices depicted in the network environment 200, such as the DSBSD 202, the server devices 204(1)-204(n), or the client devices 208(1)-208(n), for example, may be configured to operate as virtual instances on the same physical machine. For example, one or more of the DSBSD 202, the server devices 204(1)-204(n), or the client devices 208(1)-208(n) may operate on the same physical device rather than as separate devices communicating through communication network(s) 210. Additionally, there may be more or fewer DSBSDs 202, server devices 204(1)-204(n), or client devices 208(1)-208(n) than illustrated in FIG. 2. According to exemplary embodiments, the DSBSD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
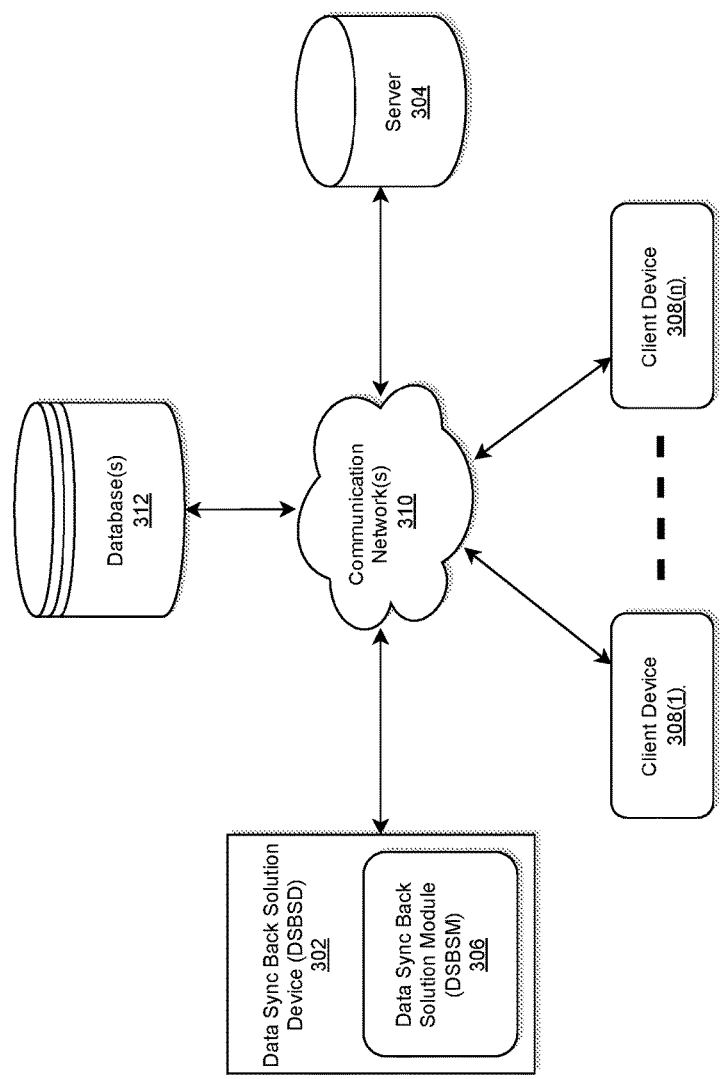
FIG. 3 illustrates a system diagram for implementing a platform, language, and cloud agnostic data sync back solution device having a platform and language agnostic data sync back solution module in accordance with an exemplary embodiment.

FIG. 3 illustrates a system diagram for implementing a platform, language, and cloud agnostic DSBSD having a platform, language, and cloud agnostic data sync back solution module (DSBSM) in accordance with an exemplary embodiment.

As illustrated in FIG. 3, the system 300 may include a DSBSD 302 within which an DSBSM 306 is embedded, a server 304, a database(s) 312, a plurality of client devices 308(1) . . . 308(n), and a communication network 310.

According to exemplary embodiments, the DSBSD 302 including the DSBSM 306 may be connected to the server 304, and the database(s) 312 via the communication network 310. The DSBSD 302 may also be connected to the plurality of client devices 308(1) . . . 308(n) via the communication network 310, but the disclosure is not limited thereto.

According to exemplary embodiment, the DSBSD 302 is described and shown in FIG. 3 as including the DSBSM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein. The database(s) may be a mainframe database, a log database that may produce programming for searching, monitoring, and analyzing machine-generated data via a web interface, etc., but the disclosure is not limited thereto.

According to exemplary embodiments, the DSBSM 306 may be configured to receive real-time feed of data from the plurality of client devices 308(1) . . . 308(n) via the communication network 310.

As may be described below, the DSBSM 306 may be configured to: receive user input or a batch service that triggers a process to change one or more fields data corresponding to a user profile; invoke, in response to triggering the process, an application programming interface (API) to call corresponding source application or microservice hosted on a source database; update, by the source application or microservice, the source database to reflect the changes made to the one or more fields data; generate a mapping identifier (ID) in response to updating the source database; store the mapping ID onto a mapping database in a predefined format; invoke another API call to obtain source table field details of the updated source database and the mapping ID that maps source column of the source table to a corresponding target column of a target table of a target database; and automatically update the target database to match the updated data of the source database based on the mapping ID, but the disclosure is not limited thereto.

The plurality of client devices 308(1) . . . 308(n) are illustrated as being in communication with the DSBSD 302. In this regard, the plurality of client devices 308(1) . . . 308(n) may be "clients" (e.g., customers) of the DSBSD 302 and are described herein as such. Nevertheless, it is to be known and understood that the plurality of client devices 308(1) . . . 308(n) need not necessarily be "clients" of the DSBSD 302, or any entity described in association therewith herein. Any additional or alternative relationship may exist between either or both of the plurality of client devices 308(1) . . . 308(n) and the DSBSD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the DSBSD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The DSBSD 302 may be the same or similar to the DSBSD 202 as described with respect to FIG. 2, including any features or combination of features described with respect thereto.

Figure 4:
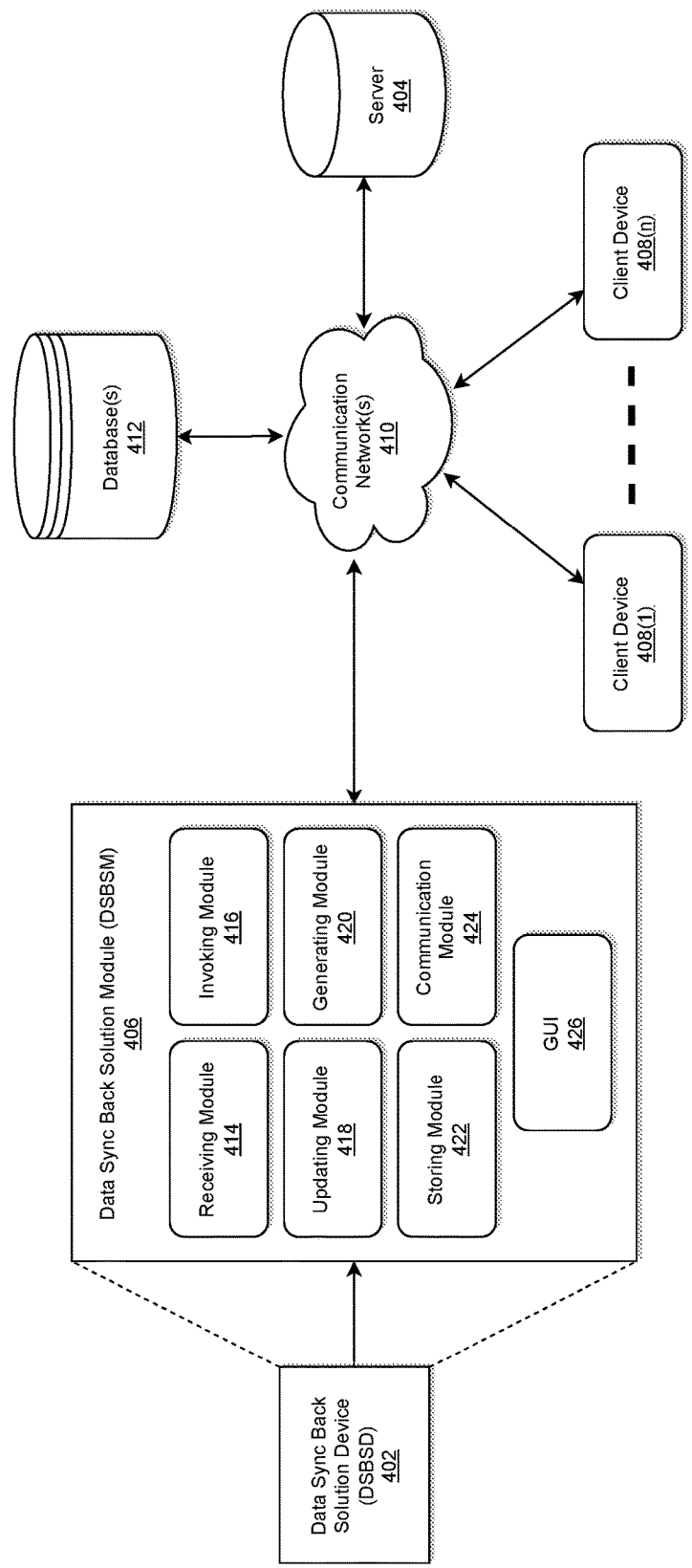
FIG. 4 illustrates a system diagram for implementing a platform, language, and cloud agnostic data sync back solution module of FIG. 3 in accordance with an exemplary embodiment.

FIG. 4 illustrates a system diagram for implementing a platform, language, and cloud agnostic DSBSD of FIG. 3 in accordance with an exemplary embodiment.

According to exemplary embodiments, the system 400 may include a platform, language, and cloud agnostic DSBSD 402 within which a platform, language, and cloud agnostic DSBSM 406 is embedded, a server 404, database(s) 412, and a communication network 410.

According to exemplary embodiments, the DSBSD 402 including the DSBSM 406 may be connected to the server 404 and the database(s) 412 via the communication network 410. The DSBSD 402 may also be connected to the plurality of client devices 408(1)-408(n) via the communication network 410, but the disclosure is not limited thereto. The DSBSM 406, the server 404, the plurality of client devices 408(1)-408(n), the database(s) 412, the communication network 410 as illustrated in FIG. 4 may be the same or similar to the DSBSM 306, the server 304, the plurality of client devices 308(1)-308(n), the database(s) 312, the communication network 310, respectively, as illustrated in FIG. 3.

According to exemplary embodiments, as illustrated in FIG. 4, the DSBSM 406 may include a receiving module 414, an invoking module 416, an updating module 418, a generating module 420, a storing module 422, a communication module 424, and a graphical user interface (GUI) 426. According to exemplary embodiments, interactions and data exchange among these modules included in the DSBSM 406 provide the advantageous effects of the disclosed invention. Functionalities of each module of FIG. 4 may be described in detail below with reference to FIGS. 4-10.

According to exemplary embodiments, each of the receiving module 414, invoking module 416, updating module 418, generating module 420, storing module 422, and the communication module 424 of the DSBSM 406 of FIG. 4 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the receiving module 414, invoking module 416, updating module 418, generating module 420, storing module 422, and the communication module 424 of the DSBSM 406 of FIG. 4 may be implemented by microprocessors or similar, and may be programmed using software (e.g., microcode) to perform various functions discussed herein and may optionally be driven by firmware and/or software.

Alternatively, according to exemplary embodiments, each of the receiving module 414, invoking module 416, updating module 418, generating module 420, storing module 422, and the communication module 424 of the DSBSM 406 of FIG. 4 may be implemented by dedicated hardware, or as a combination of dedicated hardware to perform some functions and a processor (e.g., one or more programmed microprocessors and associated circuitry) to perform other functions.

According to exemplary embodiments, each of the receiving module 414, invoking module 416, updating module 418, generating module 420, storing module 422, and the communication module 424 of the DSBSM 406 of FIG. 4 may be called via corresponding API.

Figure 5:
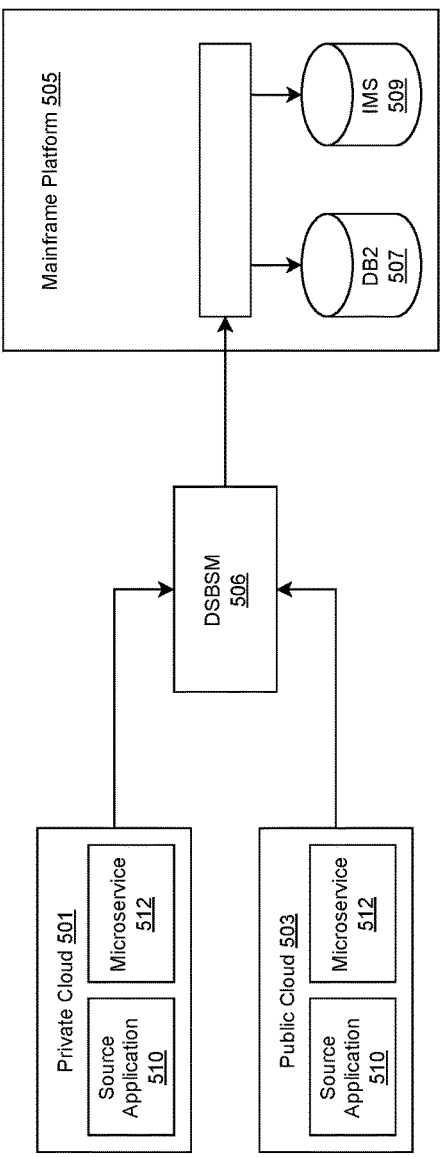
FIG. 5 illustrates an exemplary data sync back solution flow diagram implemented by the platform, language, and cloud agnostic data sync back solution module of FIG. 4 in accordance with an exemplary embodiment.

According to exemplary embodiments, FIG. 5 illustrates an exemplary data sync back solution flow diagram 500 implemented by the DSBSM 406 of FIG. 4 in accordance with an exemplary embodiment. As illustrated in FIG. 5, the exemplary d data sync back solution flow architecture diagram 500 includes a DSBSM 506, one or more private cloud 501, one or more public cloud 503, and a mainframe platform 505 that includes databases such as DB2 507 and IMS 509. The DSBSM 506 as illustrated in FIG. 5 may be same or similar to the DSBSM 406 as illustrated in FIG. 5. As illustrated in FIG. 5, data may flow from the private cloud 501 or the public cloud 503 to the DSBSM 506 where the data is being processed by the corresponding module (i.e., as illustrated in the DSBSM 406 of FIG. 4). Output data from the DSBSM 506 then flows to the mainframe platform 505 where the output data may be stored onto the DB2 507 and IMS 509, but the disclosure is not limited to mainframe platform. For example, any platform can receive the output data from the DSBSM 506 without departing from the scope of the present disclosure.

Figure 6:
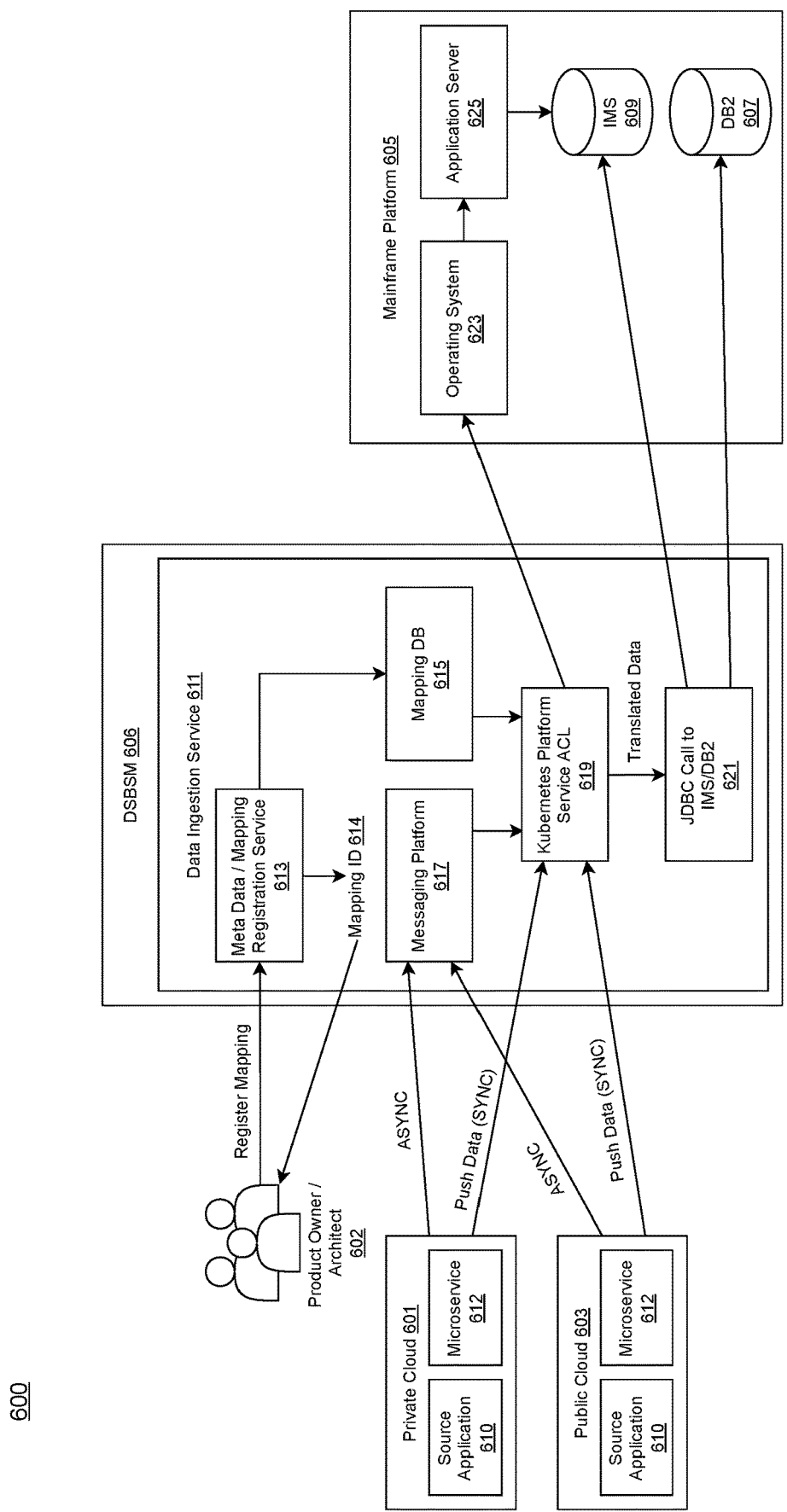
FIG. 6 illustrates an exemplary data sync back solution architecture implemented by the platform, language, and cloud agnostic data sync back solution module of FIGS. 4-5 in accordance with an exemplary embodiment.

According to exemplary embodiments, a source application 510 or a micro service 511 hosted on the private cloud 501 or the public cloud 503 may update the data in Distributed Data Store (DDS) or Authoritative Data Store (ADS) of the private cloud 501 or public cloud 503. The DSBSM 506 may build the data in the format/layout; invoke the API to send the data in a pre-defined format to a data ingestion service (i.e., see data ingestion service 611 as illustrated in FIG. 6) embedded within the DSBSM 506. The data ingestion service ensures that the data is written to IMS 509 or DB2 507 database in the mainframe platform 505.

FIG. 6 illustrates an exemplary data sync back solution architecture 600 implemented by the platform, language, and cloud agnostic DSBSM of FIGS. 4-5 in accordance with an exemplary embodiment. As illustrated in FIG. 6, the exemplary data sync back solution architecture 600 may include a private cloud 601 (same or similar to the private cloud 501 of FIG. 5), a public cloud 603 (same or similar to the public cloud 503 as illustrated in FIG. 5), a DSBSM 606 (same or similar to the DSBSM 406 as illustrated in FIG. 4 and the DSBSM 506 as illustrated in FIG. 5), and a mainframe platform 605 (same or similar to the mainframe platform 505 as illustrated in FIG. 5). The DSBSM 606 may include a data ingestion service 611 that may include a meta data/mapping registration service 613 that generates mapping ID 614 that can be stored onto a mapping DB 615. According to exemplary embodiments, the product owner/architect 602 may register mapping information data onto the meta data/mapping registration service 613. The generated mapping ID 614 from the meta data/mapping registration service 613 can be utilized by the product owner/architect 602.

According to exemplary embodiments, the data ingestion service 611 may also include a messaging platform 617 (i.e., Kafka) that may receive asynchronous data from both the private cloud 601 and the public cloud 603; and a Kubernetes platform that generates Kubernetes service ACL (Audit Command Language) 619 based on received data from the messaging platform 617, the mapping DB 615, and synchronous data received from both the private cloud 601 and the public cloud 603. Translated data is output from the Kubernetes service ACL 619 which is utilized to make JDBC (Java Database Connectivity) call to IMS/DB2 621.

According to exemplary embodiments, the mainframe platform 605 may include operating system 623 (i.e., Z/OS connect) and an application server 625. Data from the Kubernetes platform service ACL 619 may flow to the operating system 623. Data from the operating system 623 may flow to the application server and then IMS 609 may be updated with the output data from the application server 625 based on the JDBC call 621 to IMS. The DB2 607 may also be updated based on the JDBC call 621 to DB2.

Referring back to FIGS. 4-6, the process may be executed via the communication module 424 and the communication network 410, which may comprise plural networks as described above. For example, in an exemplary embodiment, the various components of the DSBSM 406, 506, 606 may communicate with the server 404, and the database(s) 412 via the communication module 424 and the communication network 410. Of course, these embodiments are merely exemplary and are not limiting or exhaustive. The database(s) 412 may include the databases included within the private cloud 501, 601 and the public cloud 503, 603 and the server 404 may include one or more servers within the private cloud 501, 601 and the public cloud 503, 603.

Referring back to FIGS. 4-6, according to exemplary embodiments, the receiving module 414 may be configured to receive user input or a batch service that triggers a process to change one or more fields data corresponding to a user profile related to the product owner/architect 602. The invoking module 416 may be configured to invoke, in response to triggering the process, an API to call corresponding source application 510, 610 or microservice 512, 612 hosted on a source database (i.e., databases within the private cloud 501, 601 and public cloud 503, 603). The updating module 418 may be configured to update, by the source application 510, 610 or microservice 512, 612 hosted on the source database (i.e., databases within the private cloud 501, 601 and public cloud 503, 603) to reflect the changes made to the one or more fields data. The generating module 420 may be configured to generate a mapping ID 614 by utilizing the meta data/mapping registration service 613 in response to updating the source database (i.e., databases within the private cloud 501, 601 and public cloud 503, 603). The storing module 422 may be configured to store the mapping ID onto the mapping DB 615 in a predefined format. The invoking module 424 may be configured to invoke another API call to obtain source table field details of the updated source database and the mapping ID that maps source column of the source table (i.e., see FIG. 7) to a corresponding target column of a target table of a target database. The updating module 418 may be configured to automatically update the target database (i.e., IMS 509, 609 and DB2 607, 507) to match the updated data of the source database (i.e., databases within the private cloud 501, 601 and public cloud 503, 603) based on the mapping ID 614.

According to an exemplary embodiment, private cloud 501, 601 may include Cockroach, Cassandra, GOS, etc., but the disclosure is not limited thereto. The public cloud 503, 603 may include AWS RDS, AWS Aurora, AWS Cassandra, etc., but the disclosure is not limited thereto. The architecture 600 may implement any other public cloud or private cloud without departing from the scope of the present disclosure.

According to exemplary embodiments, in updating the source database (i.e., databases within the private cloud 501, 601 and public cloud 503, 603), the storing module 422 may be configured to store information data corresponding to the changes made to the one or more fields in a plurality of peer network nodes within a computer network.

According to exemplary embodiments, in updating the source database (i.e., databases within the private cloud 501, 601 and public cloud 503, 603), the storing module 422 may be configured to store information data corresponding to the changes made to the one or more fields in a plurality of nodes in a replicated fashion within a distributed database.

According to exemplary embodiments, in updating the source database (i.e., databases within the private cloud 501, 601 and public cloud 503, 603), the storing module 422 may be configured to store information data corresponding to the changes made to the one or more fields in an authoritative data store.

According to exemplary embodiments, changes made to the one or more fields data may include one or more of the following processes: updating one or more fields data; deleting one or more fields data; and inserting one or more new fields data, but the disclosure is not limited thereto.

According to exemplary embodiments, invoking the API may include one or more of the following: invoking a POST API to create a new mapping ID; invoking a PUT API to update an existing mapping ID; invoking a GET API to select an existing mapping ID; and invoking a DELETE API to delete an existing mapping ID, but the disclosure is not limited thereto.

FIG. 7 illustrates an exemplary mapping information table 700 implemented by the platform, language, and cloud agnostic DSBSM 406, 506, 606 of FIGS. 4-6, respectively, in accordance with an exemplary embodiment. As illustrated in FIG. 7, the exemplary mapping information table 700 may include a source table name column 702, a source field name column 704, a source field data type column 706, a target database type column 708, a target database name column 710, a target table name column 712, a target field name column 714, a target data type column 716 and a replicate flag column 718.

According to exemplary embodiments, mapping ID 614 (see FIG. 6) may be used to map a column/field in source database (i.e., databases within the private cloud 501, 601 and public cloud 503, 603) to an IMS segment/DB2 Table on mainframe system as illustrated in FIGS. 5 and 6. The ACL service will use this mapping ID 614 to identify which table and field need to be update in mainframe of the update that was performed on source database (i.e., databases within the private cloud 501, 601 and public cloud 503, 603). Exemplary mapping IDs may include one or more of the following mapping IDS, but the disclosure is not limited thereto: Product_Name: Name of the Product that this update belongs to; Microserice_name: Micro service that invoked the API to sync the data; Source_Database_Type: Cassandra/Cockroach/GOS, etc.; Source_Database_Name: Name of the Database updated on Source side (i.e., DB2 507, 607; IMS 509, 609); Source_Table_Name: Name of the table on source end; Source_Field_Name: Name of the filed on source end; Source_Field_DataType: Data type of field on source end; Target_Database_Type: IMS/DB2; Target_Database_Name: Name of the database to be updated on target side; Target_Table_Name: Name of the table or segment on target end; Target_Filed_Name: Name of the column on target end; Target_Field_DataType: Data type of field on source end, etc.

FIG. 8 illustrates an exemplary GUI 800 implemented by the platform, language, and cloud agnostic DSDBM of FIGS. 4-6 in accordance with an exemplary embodiment. As illustrated in FIG. 8, the GUI 800 illustrates a "register your mapping" icon 802; a "search your mapping" icon 804; a box 801 where user name is displayed; a "download mapping template" icon 806; a product name box 808, a data distribution service box 810, a browse icon 812 where the user can browse uploaded user profile in a given format; an icon where the user can select whether the user wants to receive a copy of the mapping by utilizing the email icon 814; an icon 816 for registering or submitting the registration information. According to exemplary embodiments, an application team can either create the JSON directly themselves and upload to this service or use the GUI 800 portal to generate the mapping in JSON format.

Figure 9:
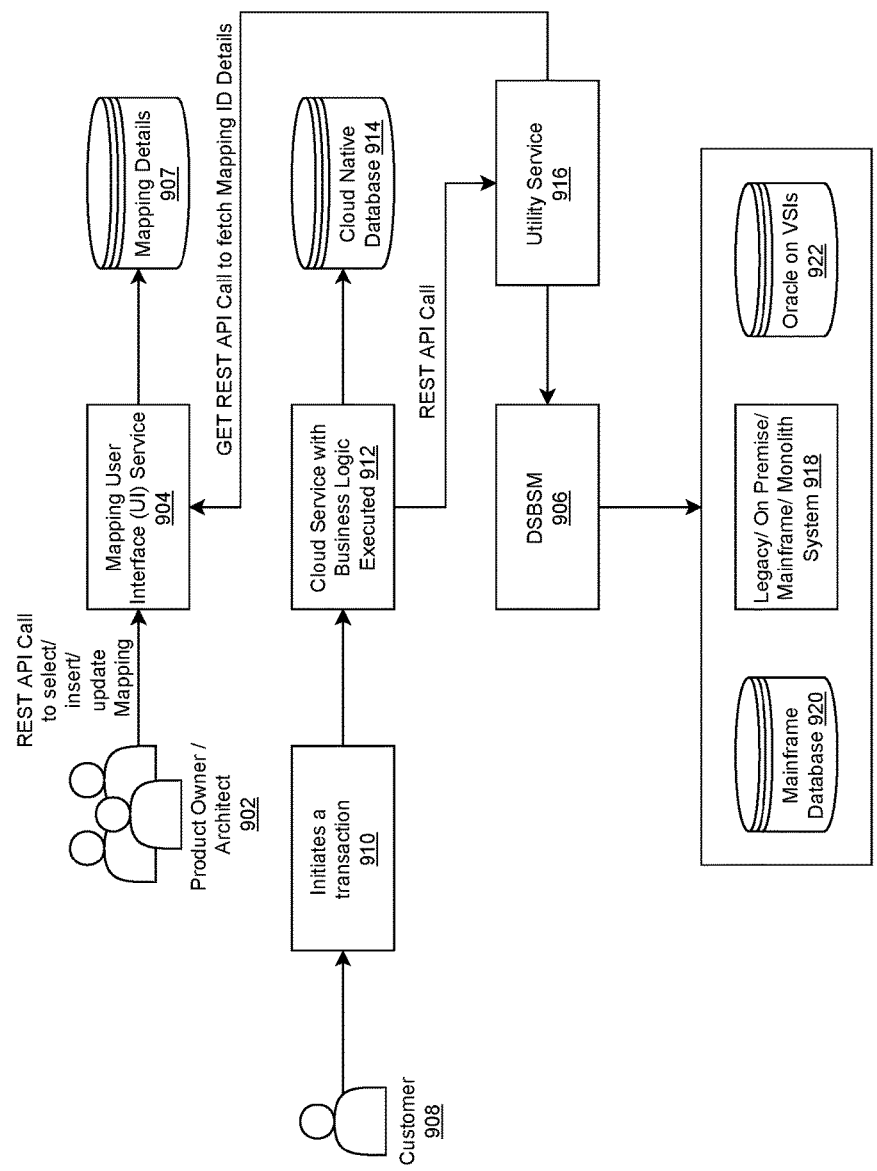
FIG. 9 illustrates another exemplary data sync back solution architecture implemented by the platform, language, and cloud agnostic data sync back solution module of FIGS. 4-6 in accordance with an exemplary embodiment.

FIG. 9 illustrates another exemplary data sync back solution architecture 900 implemented by the platform, language, and cloud agnostic DSBSM 406, 506, 606 of FIGS. 4-6, respectively, in accordance with an exemplary embodiment. It is noted that the architecture 900 may be similar to the architecture 600 of FIG. 6. For example, as illustrated in FIG. 9, REST API call can be made by the product owner/architect 902 to select or insert or update mapping data by utilizing the mapping user interface (UI) service 904. Output from the mapping user UI service 904 may be input to the mapping database 907 that stores mapping details. This mapping database 907 may the same or similar to the mapping DB 615 of FIG. 6. Mapping registration will be done by the authorized officer or the authorized person using the web portal that will be provided by the DSBSM 406, 506, 606, 906.

According to exemplary embodiments, a customer 908 may initiates a transaction 910. In response to this transaction initiation, cloud service with business logic can be executed in block 912. Output data from this block 912 may be REST API call that is being made to the utility service 916. Output data from this block 912 may be input to a cloud native database 914. Output data from the utility service 916 can flow to both the DSBSM 906 (same or similar to the DSBSM 406, 506, and 606) and the mapping user UI service 904 which utilizes GET REST API call to fetch mapping ID (i.e., mapping ID 614 as illustrated in FIG. 6) details from the database 907. The DSBSM 906 may then update accordingly the legacy or on premise mainframe or monolith system 918 and store on corresponding mainframe database 920 and Oracle on VSIs 922, but the disclosure is not limited thereto.

For example, the DSBSM 906 may be configured to create private cloud Kubernetes platform based pricing or CAM API service including a side-car which will call ACL service as a REST API or Kafka publish; create private cloud Kubernetes platform based ACL service to expose a REST API or consume from a Kafka topic; setup mapping of ACL incoming fields to IMS/DB2 (e.g., to be housed in app.yml or json file). According to exemplary embodiments, on consuming the data in ACL, the DSBSM 906 may parse and map through the translator/mapping data (stored in app.yml or json) and determine the destination location (IMS/Db2) and field to be updated on mainframe. The DSBSM 906 may utilize the JDBC call to update the IMS or BD2.

According to exemplary embodiments, the DSBSM 906 may be further configured to be utilized for reconciliation between source and target to ensure data delivery; making direct JDBC call to IMS; handling failover scenario such as ACL service failure effectively; tracking who made the change to mapping (desktop login for the GUI 800 as illustrated in FIG. 8); handling target unavailability issues (i.e., if target is in outage or stand-in mode); and maintaining atomicity, i.e., updating all or nothing, but the disclosure is not limited thereto.

Figure 10:
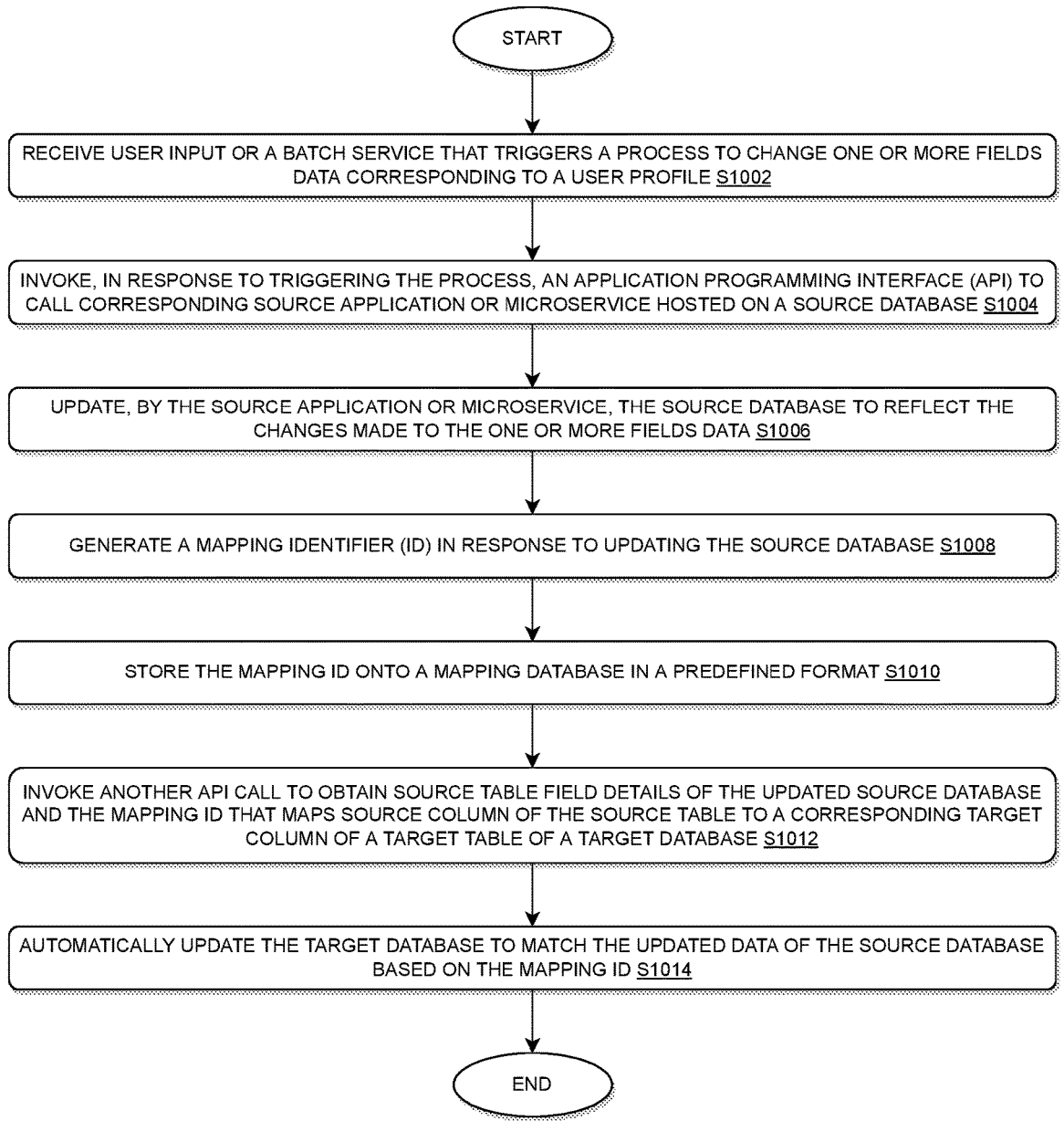
FIG. 10 illustrates an exemplary flow chart implemented by the platform, language, and cloud agnostic data sync back solution module of FIGS. 4-6 and 9 for executing both synchronous and asynchronous delivery and synchronize the data back to monolith application on any platform in accordance with an exemplary embodiment.

According to exemplary embodiments, FIG. 10 illustrates an exemplary flow chart 1000 implemented by the platform, language, and cloud agnostic DSBSM 406, 506, 606, and 906 of FIGS. 4-6 and 9, respectively, for executing both synchronous and asynchronous delivery and synchronize the data back to monolith application on any platform. It may be appreciated that the illustrated process 1000 and associated steps may be performed in a different order, with illustrated steps omitted, with additional steps added, or with a combination of reordered, combined, omitted, or additional steps.

As illustrated in FIG. 10, at step S1002, the process 1000 may include receiving user input or a batch service that triggers a process to change one or more fields data corresponding to a user profile.

At step S1004, the process 1000 may include invoking, in response to triggering the process, an API to call corresponding source application or microservice hosted on a source database.

At step S1006, the process 1000 may include updating, by the source application or microservice, the source database to reflect the changes made to the one or more fields data.

At step S1008, the process 1000 may include generating a mapping ID in response to updating the source database.

At step S1010, the process 1000 may include storing the mapping ID onto a mapping database in a predefined format.

At step S1012, the process 1000 may include invoking another API call to obtain source table field details of the updated source database and the mapping ID that maps source column of the source table to a corresponding target column of a target table of a target database.

At step S1014, the process 1000 may include automatically updating the target database to match the updated data of the source database based on the mapping ID.

According to exemplary embodiments, in the process 100, the predefined formant may be in JSON format, but the disclosure is not limited thereto.

According to exemplary embodiments, in updating the source database, the process 1000 may further include: storing information data corresponding to the changes made to the one or more fields in a plurality of peer network nodes within a computer network.

According to exemplary embodiments, in updating the source database, the process 1000 may further include: storing information data corresponding to the changes made to the one or more fields in a plurality of nodes in a replicated fashion within a distributed database.

According to exemplary embodiments, in updating the source database, the process 1000 may further include: storing information data corresponding to the changes made to the one or more fields in an authoritative data store.

According to exemplary embodiments, in the process 1000, changes made to the one or more fields data may include one or more of the following processes: updating one or more fields data; deleting one or more fields data; and inserting one or more new fields data, but the disclosure is not limited thereto.

According to exemplary embodiments, in the process 1000, invoking the API may include one or more of the following: invoking a POST API to create a new mapping ID; invoking a PUT API to update an existing mapping ID; invoking a GET API to select an existing mapping ID; and invoking a DELETE API to delete an existing mapping ID, but the disclosure is not limited thereto.

According to exemplary embodiments, in the process 1000, the target database may be a mainframe database, but the disclosure is not limited thereto.

According to exemplary embodiments, the DSBSD 402 may include a memory (e.g., a memory 106 as illustrated in FIG. 1) which may be a non-transitory computer readable medium that may be configured to store instructions for implementing a platform, language, and cloud agnostic DSBSM 406, 506, 606, 906 for automatically executing both synchronous and asynchronous delivery and synchronize the data back to monolith application on any platform, including mainframe platform (i.e., Mainframe IMS Databases) as disclosed herein. The DSBSD 402 may also include a medium reader (e.g., a medium reader 112 as illustrated in FIG. 1) which may be configured to read any one or more sets of instructions, e.g., software, from any of the memories described herein. The instructions, when executed by a processor embedded within the DSBSM 406, 506, 606, 906 or within the DSBSD 402, may be used to perform one or more of the methods and processes as described herein. In a particular embodiment, the instructions may reside completely, or at least partially, within the memory 106, the medium reader 112, and/or the processor 104 (see FIG. 1) during execution by the DSBSD 402.

According to exemplary embodiments, the instructions, when executed, may cause a processor embedded within the DSBSM 406, 506, 606, 906 or the DSBSD 402 to perform the following: receiving user input or a batch service that triggers a process to change one or more fields data corresponding to a user profile; invoking, in response to triggering the process, an application programming interface (API) to call corresponding source application or microservice hosted on a source database; updating, by the source application or microservice, the source database to reflect the changes made to the one or more fields data; generating a mapping identifier (ID) in response to updating the source database; storing the mapping ID onto a mapping database in a predefined format; invoking another API call to obtain source table field details of the updated source database and the mapping ID that maps source column of the source table to a corresponding target column of a target table of a target database; and automatically updating the target database to match the updated data of the source database based on the mapping ID. According to exemplary embodiments, the processor may be the same or similar to the processor 104 as illustrated in FIG. 1 or the processor embedded within DSBSD 202, DSBSD 302, DSBSD 402, and DSBSM 406, 506, 606, 906.

According to exemplary embodiments, in updating the source database, the instructions, when executed, may cause the processor 104 to further perform the following: storing information data corresponding to the changes made to the one or more fields in a plurality of peer network nodes within a computer network.

According to exemplary embodiments, in updating the source database, the instructions, when executed, may cause the processor 104 to further perform the following: storing information data corresponding to the changes made to the one or more fields in a plurality of nodes in a replicated fashion within a distributed database.

According to exemplary embodiments, in updating the source database, the instructions, when executed, may cause the processor 104 to further perform the following: storing information data corresponding to the changes made to the one or more fields in an authoritative data store.

According to exemplary embodiments as disclosed above in FIGS. 1-10, technical improvements effected by the instant disclosure may include a platform for implementing a platform, language, and cloud agnostic data sync back solution module configured to execute both synchronous and asynchronous delivery and synchronize the data back to monolith application on any platform, including mainframe platform (i.e., Mainframe IMS Databases), but the disclosure is not limited thereto. For example, according to exemplary embodiments as disclosed above in FIGS. 1-10, technical improvements effected by the instant disclosure may include a platform for implementing a platform and language agnostic data sync back solution module configured to execute a generic data servicing between systems where CDC can't be used; and support turning off or change of target system without impacting the source application, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects.

Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for data sync back solution for microservices to monolith by utilizing one or more processors along with allocated memory, the method comprising:
   receiving user input or a batch service that triggers a process to change one or more fields data corresponding to a user profile;
   changing, in response to triggering the process, the one or more fields data corresponding to the user profile;
   invoking, in response to triggering the process, an application programming interface (API) to call corresponding source application or microservice hosted on a source database;
   updating, by the source application or microservice, the source database to reflect the changes made to the one or more fields data;
   generating a mapping identifier (ID) in response to updating the source database;
   storing the mapping ID onto a mapping database in a predefined format;
   invoking another API call to obtain source table field details of the updated source database and the mapping ID;

mapping, by utilizing the mapping ID, a source column of a source table to a corresponding target column of a target table of a target database;

automatically updating the target database to match the updated data of the source database based on the mapping ID; and implementing a platform and language agnostic data sync back solution module that executes both synchronous and asynchronous delivery and synchronizes data back to monolith application regardless of underlying application platform.

2. The method according to claim 1, wherein the predefined formant is in Java Script Object Notation format.

3. The method according to claim 1, wherein the source database is a public cloud or a private cloud.

4. The method according to claim 1, wherein, in updating the source database, the method further comprising:

storing information data corresponding to the changes made to the one or more fields in a plurality of peer network nodes within a computer network.

5. The method according to claim 1, wherein, in updating the source database, the method further comprising:

storing information data corresponding to the changes made to the one or more fields in a plurality of nodes in a replicated fashion within a distributed database.

6. The method according to claim 1, wherein, in updating the source database, the method further comprising:

storing information data corresponding to the changes made to the one or more fields in an authoritative data store.

7. The method according to claim 1, wherein changes made to the one or more fields data include one or more of the following processes: updating one or more fields data; deleting one or more fields data; and inserting one or more new fields data.

8. The method according to claim 1, wherein invoking the API includes one or more of the following: invoking a POST API to create a new mapping ID; invoking a PUT API to update an existing mapping ID; invoking a GET API to select an existing mapping ID; and invoking a DELETE API to delete an existing mapping ID.

9. The method according to claim 1, wherein the target database is a mainframe database.

10. A system for data sync back solution for microservices to monolith, the system comprising:

a processor; and a memory operatively connected to the processor via a communication interface, the memory storing computer readable instructions, when executed, causes the processor to:

receive user input or a batch service that triggers a process to change one or more fields data corresponding to a user profile;

change, in response to triggering the process, the one or more fields data corresponding to the user profile;

invoke, in response to triggering the process, an application programming interface (API) to call corresponding source application or microservice hosted on a source database;

update, by the source application or microservice, the source database to reflect the changes made to the one or more fields data;

generate a mapping identifier (ID) in response to updating the source database;

store the mapping ID onto a mapping database in a predefined format;

invoke another API call to obtain source table field details of the updated source database and the mapping ID;

map, by utilizing the mapping ID, a source column of a source table to a corresponding target column of a target table of a target database;

automatically update the target database to match the updated data of the source database based on the mapping ID; and implement a platform and language agnostic data sync back solution module that executes both synchronous and asynchronous delivery and synchronizes data back to monolith application regardless of underlying application platform.

11. The system according to claim 10, wherein the predefined formant is in Java Script Object Notation format.

12. The system according to claim 10, wherein the source database is a public cloud or a private cloud.

13. The system according to claim 10, in updating the source database, wherein the processor is further configured to:

store information data corresponding to the changes made to the one or more fields in a plurality of peer network nodes within a computer network.

14. The system according to claim 10, in updating the source database, wherein the processor is further configured to:

store information data corresponding to the changes made to the one or more fields in a plurality of nodes in a replicated fashion within a distributed database.

15. The system according to claim 10, in updating the source database, wherein the processor is further configured to:

store information data corresponding to the changes made to the one or more fields in an authoritative data store.

16. The system according to claim 10, wherein changes made to the one or more fields data include one or more of the following processes: updating one or more fields data; deleting one or more fields data; and inserting one or more new fields data.

17. The system according to claim 10, wherein invoking the API includes one or more of the following: invoking a POST API to create a new mapping ID; invoking a PUT API to update an existing mapping ID; invoking a GET API to select an existing mapping ID; and invoking a DELETE API to delete an existing mapping ID.

18. The system according to claim 10, wherein the target database is a mainframe database.

19. A non-transitory computer readable medium configured to store instructions for data sync back solution for microservices to monolith, the instructions, when executed, cause a processor to perform the following:

receiving user input or a batch service that triggers a process to change one or more fields data corresponding to a user profile;

changing, in response to triggering the process, the one or more fields data corresponding to the user profile;

invoking, in response to triggering the process, an application programming interface (API) to call corresponding source application or microservice hosted on a source database;

updating, by the source application or microservice, the source database to reflect the changes made to the one or more fields data;

generating a mapping identifier (ID) in response to updating the source database;

storing the mapping ID onto a mapping database in a predefined format;

invoking another API call to obtain source table field details of the updated source database and the mapping ID;

mapping, by utilizing the mapping ID, a source column of a source table to a corresponding target column of a target table of a target database;

automatically updating the target database to match the updated data of the source database based on the mapping ID; and implementing a platform and language agnostic data sync back solution module that executes both synchronous and asynchronous delivery and synchronizes data back to monolith application regardless of underlying application platform.

20. The non-transitory computer readable medium according to claim 19, wherein the predefined formant is in Java Script Object Notation format and wherein the source database is a public cloud or a private cloud.

\* \* \* \* \*